US011362932B2

(12) United States Patent
Hitz et al.

(10) Patent No.: US 11,362,932 B2
(45) Date of Patent: Jun. 14, 2022

(54) ACHIEVING HIGHLY AVAILABLE AUTONOMOUS SYSTEMS (AS) IN A SOURCE-SELECTED PATH ROUTING NETWORK

(71) Applicant: Anapaya Systems AG, Zurich (CH)

(72) Inventors: Samuel Hitz, Zurich (CH); Sergiu Costea, Zurich (CH)

(73) Assignee: Anapaya Systems AG, Zurich (CH)

( * ) Notice: Subject to any disclaimer, the term of this patent is extended or adjusted under 35 U.S.C. 154(b) by 176 days.

(21) Appl. No.: 17/006,975

(22) Filed: Aug. 31, 2020

(65) Prior Publication Data

US 2022/0021602 A1 Jan. 20, 2022

(30) Foreign Application Priority Data

Jul. 16, 2020 (EP) ..................................... 20186292

(51) Int. Cl.
*H04L 12/721* (2013.01)
*H04L 12/735* (2013.01)
*H04L 45/12* (2022.01)
*H04L 45/02* (2022.01)
*H04L 45/128* (2022.01)

(52) U.S. Cl.
CPC ............ *H04L 45/123* (2013.01); *H04L 45/02* (2013.01); *H04L 45/04* (2013.01); *H04L 45/1283* (2013.01)

(58) Field of Classification Search
CPC ....... H04L 45/123; H04L 45/02; H04L 45/04; H04L 45/1283
USPC ......................................................... 370/238
See application file for complete search history.

(56) References Cited

U.S. PATENT DOCUMENTS 6,633,544 B1 10/2003 Rexford et al.
7,151,775 B1 12/2006 Renwick et al.
7,751,331 B1 7/2010 Blair et al.
(Continued)

FOREIGN PATENT DOCUMENTS

WO WO 2019/162210 A1 8/2019

OTHER PUBLICATIONS

European Patent Office, Extended European Search Report, dated Dec. 3, 2020, 5 pages, European Patent Office, 80298 Munich, Germany.

(Continued)

*Primary Examiner* — Faisal Choudhury
(74) *Attorney, Agent, or Firm* — Davis Wright Tremaine LLP; Greg Rosenthal

(57) ABSTRACT

The present application refers to a method and a system for reliably forwarding data packets in a source-selected path routing network including a plurality of autonomous systems. For this purpose, a data plane of each of the plurality of autonomous systems that comprises one or more border routers and a control plane of each of the plurality of autonomous systems that comprises a control service are split into two or more shards. Each of said shards contains exactly one control service and at least one border router and is responsible for processing, storing and propagating path information only for a subset of existing links between an autonomous system and a neighboring autonomous system within the source-selected path routing network. Hence, in the source-selected path routing network, each individual shard is not critical and thus can fail without compromising the availability of the entire system.

20 Claims, 5 Drawing Sheets

(56) References Cited

U.S. PATENT DOCUMENTS

| | | | |
|---|---|---|---|
| 7,752,332 B2 | 7/2010 | Jiang et al. | |
| 8,897,141 B2 | 11/2014 | Liu et al. | |
| 8,989,046 B1* | 3/2015 | Train | H04L 45/02 |
| | | | 370/254 |
| 10,893,022 B1* | 1/2021 | Li | H04L 45/748 |
| 2005/0008015 A1* | 1/2005 | Meda | H04L 47/2458 |
| | | | 370/392 |
| 2008/0031236 A1* | 2/2008 | Yang | H04L 45/02 |
| | | | 370/389 |
| 2009/0245243 A1 | 10/2009 | Rangarajan et al. | |
| 2010/0309795 A1 | 12/2010 | Shah et al. | |
| 2013/0188493 A1 | 7/2013 | Numata | |
| 2014/0129735 A1 | 5/2014 | Thyni et al. | |
| 2015/0207736 A1 | 7/2015 | Roch | |
| 2016/0065449 A1 | 3/2016 | Pani et al. | |
| 2020/0127913 A1 | 4/2020 | Filsfils | |
| 2021/0160279 A1* | 5/2021 | Watts | H04L 45/04 |

OTHER PUBLICATIONS

Adrian Perring et. al., SCION: A Secure Internet Architecture, Aug. 30, 2017, Zurich, Switzerland available at https://www.scion-architecture.net/pdf/SCION-book.pdf.

* cited by examiner

ACHIEVING HIGHLY AVAILABLE AUTONOMOUS SYSTEMS (AS) IN A SOURCE-SELECTED PATH ROUTING NETWORK

CROSS-REFERENCED APPLICATION

The present application claims priority to European Patent Application EP20186292, which was filed on Jul. 16, 2020 and titled "ACHIEVING HIGHLY AVAILABLE AUTONOMOUS SYSTEMS (AS) IN A SOURCE-SELECTED PATH ROUTING NETWORK," the disclosure of which is incorporated herein by reference in its entirety.

TECHNICAL FIELD

The present application pertains to the field of communication networks, in particular computer networks. In particular, it relates to a system and a method for reliably forwarding data packets within a source-selected path routing network.

BACKGROUND

Most Internet traffic today consists of Internet Protocol (IP) packets. To send IP traffic, a host first determines an IP address of a given destination, often using a service such as Domain Name Service (DNS). The host includes the IP address in an IP header section of a data packet and sends the packet to a nearby router. At this point, the host no longer has any control over the path the data packet will take to reach its destination; i.e., the data packet travels through a sequence of routers, each of said routers deciding where to send the packet based on the destination IP address and its local routing table (and possibly other packet contents). For routers located in the core of the Internet, this routing table is often built from information exchanged through the Border Gateway Protocol (BGP). Such principle of data packet transport is sometimes referred to as hop-by-hop transport or next-hop transport. Communication networks employing such transport principles are referred to as packet switched networks.

However, packet forwarding according to the next-hop transport scheme in a packet switched network such as the current Internet suffers from many security and reliability issues.

In contrast hereto, SCION, as described in the book "SCION: A Secure Internet Architecture", by A. Perrig et al., which is hereby included by reference in its entirety, available at https://www.scion-architecture.net/pdf/SCION-book.pdf (and referred to as the SCION book in what follows; also available as eBook, ISBN 978-3-319-67080-5; and in printed form, ISBN 978-3-319-67079-9), is a next generation Internet architecture with a focus on improving both the security and the reliability of networks by performing the routing of data packets in a different way. As opposed to IP networks where only the destination address is needed for forwarding, SCION implements a model called source-selected path routing. In this model, each packet includes the full path—a sequence of router interfaces and Autonomous Systems (ASes) constituting the basic element of SCION—it must traverse to reach its destination. To send a new data packet, a host queries SCION infrastructure services and receives one or more paths. The host then chooses the path it prefers and embeds it in a section of the data packet called the path. Any router along said path from the host to a destination address follows the instructions contained in this path when forwarding the data packet without the need for any lookups. The routers along said path thus do not make any routing decision other than whether or not to forward the data packet.

As opposed to IP, SCION gives clients control over how traffic is forwarded. This allows clients to choose paths by taking into account security, network performance, reliability, and financial cost.

In SCION, possible routing paths along which data packets may be sent are initially explored by utilizing path-segment construction beacons (PCBs). During said process referred to as beaconing, PCBs accumulate cryptographically protected path information between autonomous systems (ASes) as they traverse the SCION network. The collected information is chained together to create a data transmission path segment that traverses a sequence of ASes. The path resolution process of SCION creates an end-to-end forwarding path to a destination and consists of a path lookup, from where the path segments may be obtained as well as a path combination regarding the actual forwarding path.

Path segments for data transmission are created, stored, and propagated to further, neighboring ASes by a control service (CS) located in a control plane of the AS. Apart from the control plane, each AS of the source-selected path routing network also comprises one or more Border Routers (BRs), which are responsible for forwarding data packets from a local host of an AS to a destination AS along a path created by combining the different path segments that are retrieved from the CS.

There exist different known solutions to mitigate the effects that a failure of the BR and the CS may have on the functioning of the AS and thus on the whole SCION network. In general, it is highly recommended to add multiple BRs and CSes.

While this is straightforward for BRs, the multiplication of CSes includes implementing complex logic related to path construction and path retrieval. In general, it is possible to organize the multiple CSes either in a cluster such that they look to the outside world as a single node or to deploy the multiple CSes as independent CS instances.

Such former solution solves the availability problem of the AS. However, clusters are very complex to set up and maintain. Clusters typically need an odd number of machines to run and thus are not very flexible. Moreover, they can only operate as long as a consensus exists. This means that if the cluster is for example made up of five CS nodes, consensus is lost if three of them fail and service degradation will most likely occur at that point.

The latter solution of providing a plurality of identical CSes as independent CS instances might also solve the problem of guaranteeing the availability of the functionality of the AS within the SCION network. However, simply adding more CSes that do the same thing leads to poor resource efficiency, since the plurality of independent CSes might end up performing the same steps in parallel as long as all of them are functional. Moreover, if the plurality of CSes do the same thing at the same time, such as for example constructing a same path segment, data consistency issues might also open up and duplicate work might be performed.

Hence, there exists a need for a method and an architecture of the ASes that at the same time guarantees a better availability and reduced complexity as the cluster solution and a better resource utilization compared to the solution of providing a plurality of identical CSes in the event of a failure of either or both of the CS and the BRs, respectively.

SUMMARY

In the following a summary is provided to introduce a selection of representative concepts in a simplified form that are further described below in the detailed description. This summary is not intended to identify key features or essential features of the claimed subject matter, nor is it intended to be used in any way that would limit the scope of the appended claims.

As indicated below, the present application cannot only be applied to the specific context of a SCION network, but is applicable to any kind of source-selected path routing network that works in a similar way as SCION. Therefore, use of the specific term SCION network in the following should be understood to mean that also other kind of source-selected path routing networks may be used instead of a SCION network. Further, when referring to a SCION network, this present application incorporates SCION as described in the book "SCION: A Secure Internet Architecture", by A. Perrig et al., which is hereby incorporated herein by reference for its entirety, available at https://www.scion-architecture.net/pdf/SCION-book.pdf (and referred to as the SCION book in what follows; also available as eBook, ISBN 978-3-319-67080-5; and in printed form, ISBN 978-3-319-67079-9). Definitions from the SCION book are also incorporated herein by reference where the definitions do not contradict this present application. For example, an Autonomous System (AS) is a locally connected network under a common administrative control (e.g., a network at a university is an AS). If an organizational entity operates multiple networks that are not directly connected through a local area network, then the different networks are considered different ASes in SCION. See, e.g., page 437 of SCION book.

The present application provides an architecture of an AS forming the basic unit of a SCION network that allows forwarding data packets from a host to a destination AS in the SCION network in a reliable and efficient way even in the case of a failure of one or more of the fundamental properties BR and CS of an AS. In more detail, the core of the present application consists of splitting the data plane and the control plane into multiple zones called shards. Splitting can also be referred to as dividing, where dividing general means a SCION network is split or divided into a set of ASes.

With our invention, each AS can now be divided into multiple shards. Each of said shards contains exactly one CS and at least one BR and is responsible for processing, storing and propagating path information only for a subset of existing links between the AS and a neighboring AS within the SCION network. In the SCION network, each individual shard is not critical and thus can fail without compromising the availability of the entire system.

If the BR of one shard of an AS fails, path information for constructing path segments cannot flow through it and thus will not reach the corresponding CS of the same shard. However, thanks to the sharded nature of the AS, path information can still flow via the BRs of the remaining shards to the respective CSes of said shards. Hence, the CSes of said remaining shards have access to path information received from a neighboring AS and thus may construct new path segments. For this purpose, said CSes of the remaining shards are configured to supplement the received path information by adding information about a subset of the links connecting the AS to a first neighboring AS and to register the supplemented path information in order to make it available to local and remote hosts. Further, said CSes of the remaining shards are configured to store the resulting shard of path segments in respective segment storages, and further to propagate said shards of supplemented path information to a second neighboring AS.

If, on the other hand, the BR functions again properly and instead the corresponding CS of the same shard fails, said BR would still be available for forwarding data packets, but no new path segments are constructed through it. Namely, if the CS of said specific shard is down due to a failure, CSes in neighboring ASes do not exchange any path information with the failed CS. However, the CSes of the remaining shards of the sharded AS are still provided with path information for constructing fresh path segments by supplementing said path information by adding information about a subset of links between the respective shards of the AS and a neighboring AS and by registering said path segments.

This functioning can further be improved if the BR of one shard is configured to notice that its corresponding CS has failed and subsequently directly reroutes the path information it sees to one of the CSes of the remaining shards of the sharded AS.

In a further aspect of the present application, the BR is configured to notice that its corresponding CS in the same shard has failed by periodically performing a health check by using a health port that is exposed by the corresponding CS.

It is further an important aspect of the present application that the CS of one shard is completely independent and separate from the CSes of all remaining shards of the plurality of shards in an AS.

Further, in general, the path information used for constructing the path segments by the CS of each shard comprises a path-segment construction beacon (PCB). Constructing generally means generating according to a specific set of rules.

The present application is further directed to a method for forwarding data packets in a source-selected path routing network such as for example a SCION network that includes a plurality of autonomous systems in both an efficient and a reliable way. In a first step of said method, the data plane of each of the plurality of ASes comprising one or more BRs and the control plane of each of the plurality of ASes comprising a plurality of CSes are split into two or more shards, each of which includes one or more BRs and exactly one CS. The one or more BRs of each shard further receive path information sent from the CSes of a neighboring AS and forward said path information to the corresponding CSes of each shard. The CSes of each shard subsequently construct a shard of path segments by supplementing the received path information by adding information about a corresponding subset of links connecting the respective shard to the neighboring AS and by registering the supplemented path information in order to make it available to local and remote hosts. Moreover, the CSes of each shard also store the constructed path segments and propagate them to neighboring ASes. In response to a query for available path segments for routing data packets to a destination AS, a local host thus is always provided with at least the path segments constructed by the CS of at least one shard. Said retrieved path segments are further combined to a complete path from the local host to the destination AS, along which data packets may finally be forwarded to the destination AS. A local host refers to any host local to that AS.

BRIEF DESCRIPTION OF THE DRAWINGS

The subject matter of the present application will be explained in more detail in the following text with reference to exemplary embodiments, which are illustrated in the attached drawings, of which.

DETAILED DESCRIPTION

Figure 1:
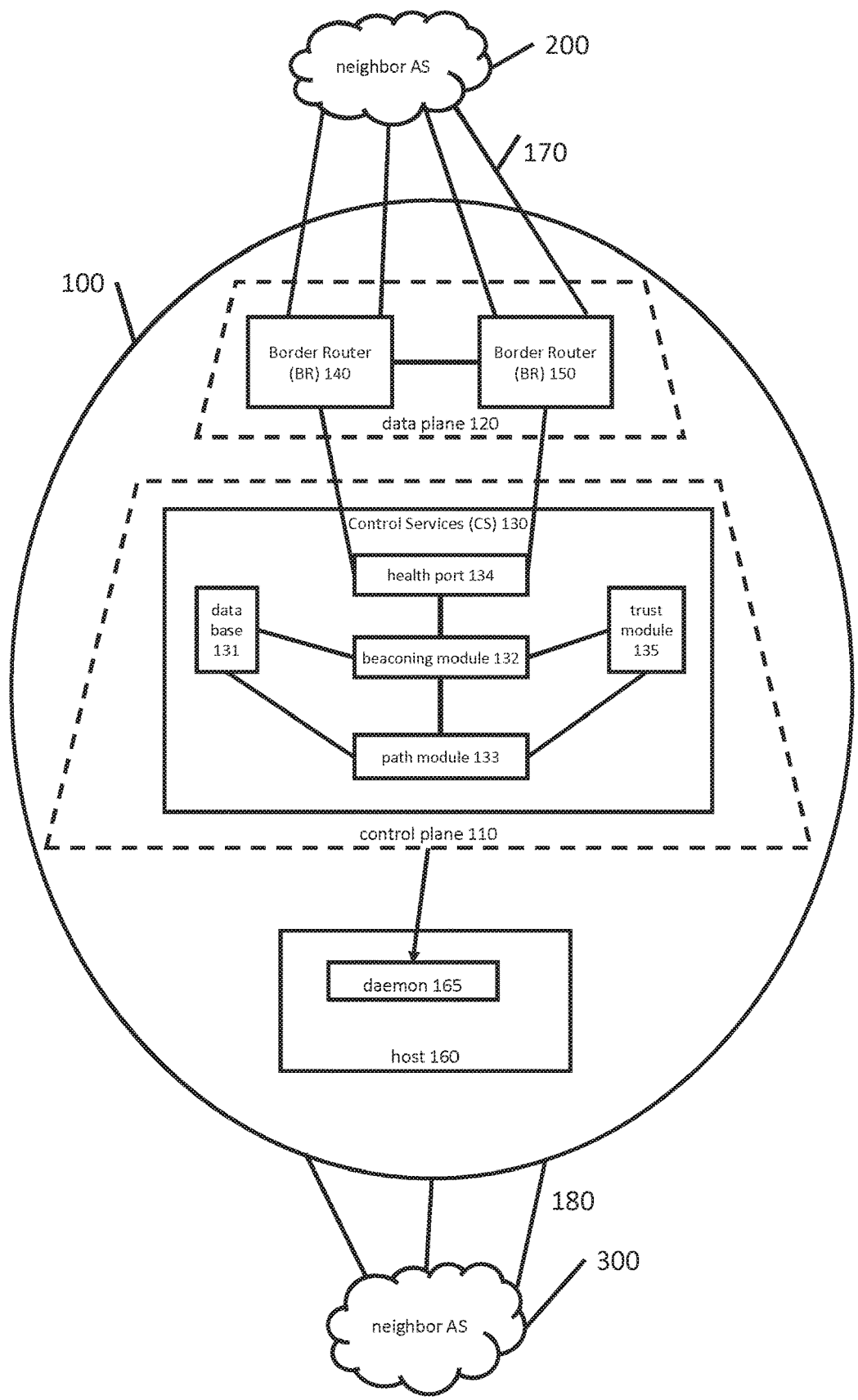
FIG. 1 illustrates a part of a source-selected path routing network comprising three autonomous systems.

FIG. 1 shows an autonomous system (AS) 100, which is the basic unit of a source-selected path routing network. An example of such a source-selected path routing network is the SCION network described above. However, the present application is applicable to any kind of source-selected path routing network comprising a plurality of ASes and a path along which a data packet is routed chosen by a host at the moment of creating the data packet. Said path is embedded into the data packet and all routers that the data packet encounters on its way through the source-selected path routing network may merely choose whether or not to forward the data packet along the path.

The present application provides at least one technical solution and/or advantage to a technical problem. For example, it improves security and efficiency for communicating information over the internet or an intranet. In some embodiments, the technology of the present application has the advantage that it is not necessary to provide multiple identical CSes in an AS to guarantee the construction of fresh (e.g., new) paths and the forwarding of data packets from a local host to a destination at any time. Providing multiple identical CSes can be less efficient compared to providing one single sharded CS, as all of the multiple identical CSes might perform the same steps in parallel, as long as all of them are functional. Also, if multiple CSes, e.g., construct a same path at the same time, this may lead to problems with data consistency.

The AS 100 shown in FIG. 1 is connected via links 170 to a first neighboring AS 200 and via links 180 to a second neighboring AS 300. It is important to point out that neighboring ASes 200 and 300 are merely examples and that the number of neighboring ASes may be much higher.

FIG. 1 further illustrates the substructure of each of the ASes using the example of AS 100. As can be seen from FIG. 1, AS 100 comprises a data plane 120 including one or more border routers (BR) 140, 150, a control plane 110 comprising one control service (CS) 130 and a local host 160. The control plane is responsible for the discovery of network paths, e.g., for the exchange of routing information between network nodes. The control plane can make decisions about where traffic is sent and deals with questions such as how routes are established, which paths exist, what quality individual links offer, etc. After all routing-related tasks are completed, data packets are forwarded in a data plane. The control plane can also route using cryptographically secured methods. The data plane (sometimes also referred to as the forwarding plane) is responsible for forwarding data packets that end hosts have injected into the network. The data plane can forward packets using cryptographically secure methods. After routes have been established in the control plane, packets are forwarded according to these routes in the data plane.

Hence, the structure of the AS 100 shows a clear separation between the data plane 120 that is configured to forward data packets received from the host 160 across the links 170 to the neighboring AS 200 and the control plane 110 that is configured to exchange path information with the CSes of the neighboring ASes 200, 300. It should be clear that neighboring ASes 200 and 300 may have a similar structure.

BRs 140 and 150 in the data plane 120 are configured to receive path information from the first neighboring AS 200 and subsequently to forward said path information to CS 130 of the AS 100.

Further, BRs 140 and 150 are responsible for forwarding data packets from the local host 160 across links 170 to the neighboring AS 200 as well as for forwarding data packets that enter AS 100 through links 170 and leave AS 100 through links 180 and vice versa. Links 170 connect BRs 140 and 150 with respective BRs (not shown) of neighboring AS 200.

CS 130, on the other hand, has the main task of constructing path segments, which the local host 160 can combine together to a complete path for forwarding a data packet to a destination AS. The CS 130 constructs said path segments by supplementing the path information received from the first neighboring AS 200 by adding information about the plurality of links connecting AS 100 to the first neighboring AS 200 and by registering the supplemented path information in order to make it available to the local host 160 as well as to remote hosts (not shown) within the source-selected path routing network. The path information comprises so called path-segment construction beacons (PCB), which are called path segments after performing said registration.

When performing said registration of the supplemented path information, the CS 130 makes a decision as to which of the path information to make available to the local hosts such as local host 160 and which path information to make available to remote hosts. In order to make path information available to said remote hosts, the corresponding path information has to be registered in the core of the source-selected path routing network and not merely locally in AS 100. The remote hosts may use these path segments to combine to a path for reaching the AS 100.

CS 130 is further configured to store the constructed path segments in a database 131, from where they may be retrieved by the local host 160.

Moreover, CS 130 may also be configured to propagate the path information supplemented by the information about the plurality of links 170 to the second neighboring AS 300 as well as to further neighboring ASes not shown in FIG. 1.

It should be pointed out that the constructed path segments that are stored in the database 131 may have a limited validity period of roughly between five minutes and a day, depending on an applied policy, before the paths expire. Therefore, it is necessary that the CS 130 always constructs fresh (e.g., new) path segments between the plurality of ASes in the source-selected path routing network.

While each AS 100, 200, 300 only comprises one CS 130, each AS 100, 200, 300 may comprise one or more BRs 140, 150. In the example of AS 100, two BRs 140, 150 are shown, which are connected via links with each other. Alternatively, AS 100 may comprise only a single BR or more than two BRs.

When local host 160 wants to send data packets to a destination AS, local host 160 sends first a query for information about available path segments for routing said data packets to the destination AS. This query is sent out by a daemon 165, which is computer program running in the background of the local host 160, to the database 131 of CS 130. Daemon 165 is subsequently configured to fetch the constructed path segments from database 131 of CS 130 and provides them to the local host 160. Daemon 165 is further configured to combine said fetched path segments to a path from the local host 160 to the destination AS. Said path is further embedded in the data packet to ensure that the data packet is forwarded through the source-selected path routing network along said specific path.

FIG. 1 further shows a substructure of CS 130. As can be seen in FIG. 1, apart from database 131, in which the constructed fresh path segments are stored, CS 130 also comprises a beaconing module 132, a path module 133, a health port 134 and a trust module 135.

The actual functionality of constructing path segments based on the path information received from the CSes of the first neighboring AS 200 is performed by the beaconing module 132, whereas path module 133 is responsible for responding to a path segment request received from daemon 165 of local host 160. When receiving such a request for path segments to construct a path to forward a data packet from local host 160 to a specific destination AS, path module 133 queries database 131 in order to provide daemon 165 with one or more possible path segments.

However, it is a mere implementation choice to merge the functionality of the beaconing module 132 and of the path module 133 into CS 130. Alternatively, it would also be possible to maintain said services as separate modules without any impact on the functioning of the actual present application.

CS 130 also comprises a health check port 134, which is exposed to the one or more BRs 140, 150. Hence, BRs 140, 150 can use said health check port 134 for periodically checking whether CS 130 is still healthy (e.g., operational and functional) and working correctly or whether CS 130 has failed. The importance of the health check port 134 in the light of the present application will become apparent later.

FIG. 1 further shows that CS 130 comprises a trust module 135. The purpose of said trust module 135 consists in maintaining and renewing security certificates for AS 100.

Figure 2:
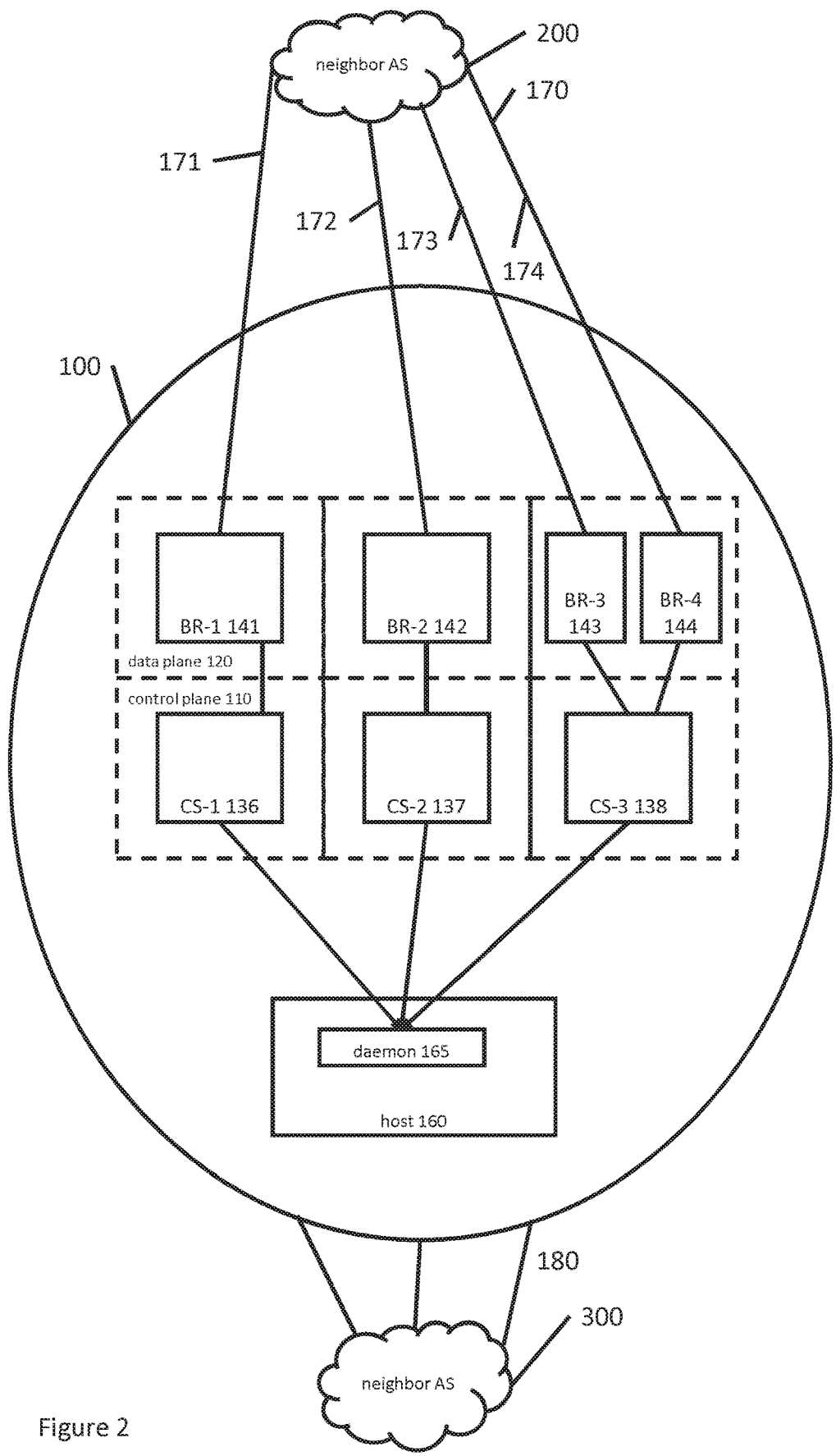
FIG. 2 illustrates a sharded structure of an autonomous system in a source-selected path routing network according to an embodiment of the present application.

FIG. 2 shows an embodiment of the present application. Illustratively, a source-selected path routing network comprises AS 100, first neighboring AS 200 connected thereto via links 170 and second neighboring AS 300 connected to AS 100 via links 180. Contrary to FIG. 1, both control plane 110 and data plane 120 of AS 100 are shown as being split up into several different zones, called shards, respectively. In the shown embodiment, control plane 110 is split into three shards and data plane 120 is also split into three shards. a shard is an independent unit of processes that implements the full functionality of the control plane and the data plane in that specific zone. The sum of all shards together collectively implements the functionality of an AS. While the failure of any shard does not affect the correctness of any other shard While FIG. 2 shows three shards for both the control plane 110 and the data plane 120, the present application encompasses a division of the two planes into any number of shards. In another preferred embodiment, the control plane 110 and the data plane 120 are each split into two shards.

Each of said three shards of the control plane 110 in FIG. 2 comprises exactly one CS, the first shard comprises CS-1 136, the second shard comprises CS-2 137, and the third shard comprises CS-3 138. Hence, CS 130 is split up into three different sub-CSes 136, 137 and 138.

The first shard of data plane 120 comprises BR-1 141, the second shard comprises BR-2 142, whereas the third shard includes both, BR-2 143 and BR-4 144. Hence, each shard of the data plane 120 may comprise one or more sub-BRs. Thus, BR 140 of FIG. 1 has been split up into the four different sub-BRs 141, 142, 143 and 144. BR 150 of FIG. 1 is not shown in FIG. 2 for clarity reasons, but BR 150 might be also split up into three different shards of the data plane.

Since both CS 130 and BR 140 have been split up into several different sub-CSes and sub-BRs, each of said sub-CSes and sub-BRs performs a subset of the overall functionality of CS 130 and BR 140 as described above. In general, each shard is responsible for processing, storing, and disseminating the path information only for a subset of the links 170 connecting AS 100 to the neighboring AS 200.

Local host 160 and its daemon 165, on the other hand, are not part of any shard. Daemon 165 acts as a multiplexer across the different shards and thus hides the sharded nature of AS 100 from local host 160. Daemon 165 knows that it is running in a sharded AS, because it needs to query the multiple CSes CS-1 136, CS-2 137 and CS-3 138 for path information.

Moreover, in the context of sharded AS 100, it is important to point out that the CS of one shard is completely independent and separate from the CSes of remaining shards of the plurality of shards.

In more detail, for the scenario shown in FIG. 2, this means that CS-1 136 contains information about link 171, CS-2 137 contains information about link 172 and CS-3 138 contains information about links 173 and 174. Hence, it is a consequence of splitting CS 130 into the three sharded CSes 136, 137 and 138 that for example CS-2 137 does not contain information about links 171, 173 and 174, respectively.

Hence, CS-1 136 is configured to construct merely a shard of the total path segments constructed by original CS 130 by supplementing the received path information by adding information about the respective subset of links comprising link 171 in the example shown in FIG. 2 and by subsequently registering the supplemented path information to make it available to local and remote hosts. Further, CS-1 136 is accordingly only configured to store the resulting shard of path segments in a segment storage and to propagate said shard of supplemented path information to the second neighboring AS 300.

Likewise, CS-2 137 is merely configured to construct, store, and forward a second shard of the total path segments constructed by original CS 130 that are based on a second subset of links comprising link 172, whereas CS-3 138 is merely configured to construct, store, and forward a third shard of the total path segments constructed, stored, and propagated by original CS 130. Said third shard of the total path segments is hereby based on a third subset of links comprising links 173 and 174, respectively.

With regard to the sharded BR 140 comprising BR-1 141, BR-2 142, BR-3 143 and BR-4 144, BR-1 141 is configured to forward data packets originating from the local host 160 merely using constructed path segments corresponding to the subset of links 171. Likewise, BR-2 142 is only capable of forwarding data packets to neighboring AS 200 using constructed path segments corresponding to the subset of links 172. The same holds for BR-3 143 and BR-4 144 and their corresponding subset of links 173 and 174, respectively.

AS 100 can only function correctly within the framework of a source-selected path routing network, if its corresponding BRs 141, 142, 143, 144 and CSes 136, 137, 138 are running in order to provide fresh path segments and the forwarding of data packets, respectively. However, due to software and hardware issues, such a correct functioning is not always the case. For example, a BR can fail and hence stops the forwarding of information across its connected links. Depending on how many BRs and CSes AS 100 has, and depending on how they are configured, the reliability of AS 100 in the face of faults can vary.

In the most basic case of AS 100 not being sharded and merely comprising one CS 130 and one BR 140, a failure of BR 140 means that no data packet can enter or leave AS 100. Hence, in this case, a failure of BR 140 results in disconnecting AS 100 from the complete source-selected path routing network.

Alternatively, in such a basic AS 100 comprising only one CS 130 and one BR 140, a failure of CS 130 on the one hand results in local host 160 no longer being able to retrieve path segments for combining to a path for routing data packets to a destination AS in the source-selected path routing network. On the other hand, since CS 130 of AS 100 is down, CSes in neighboring ASes 200, 300 cannot exchange path information with AS 100 anymore. Therefore, CS 130 is no longer able to construct fresh path segments.

With regard to failures of one or both of CS 130 and BR 140 of AS 100, the sharded structure of AS 100 offers significant advantages, which become apparent from the following detailed description of a failure of both a BR and a CS in a sharded AS.

Figure 3A:
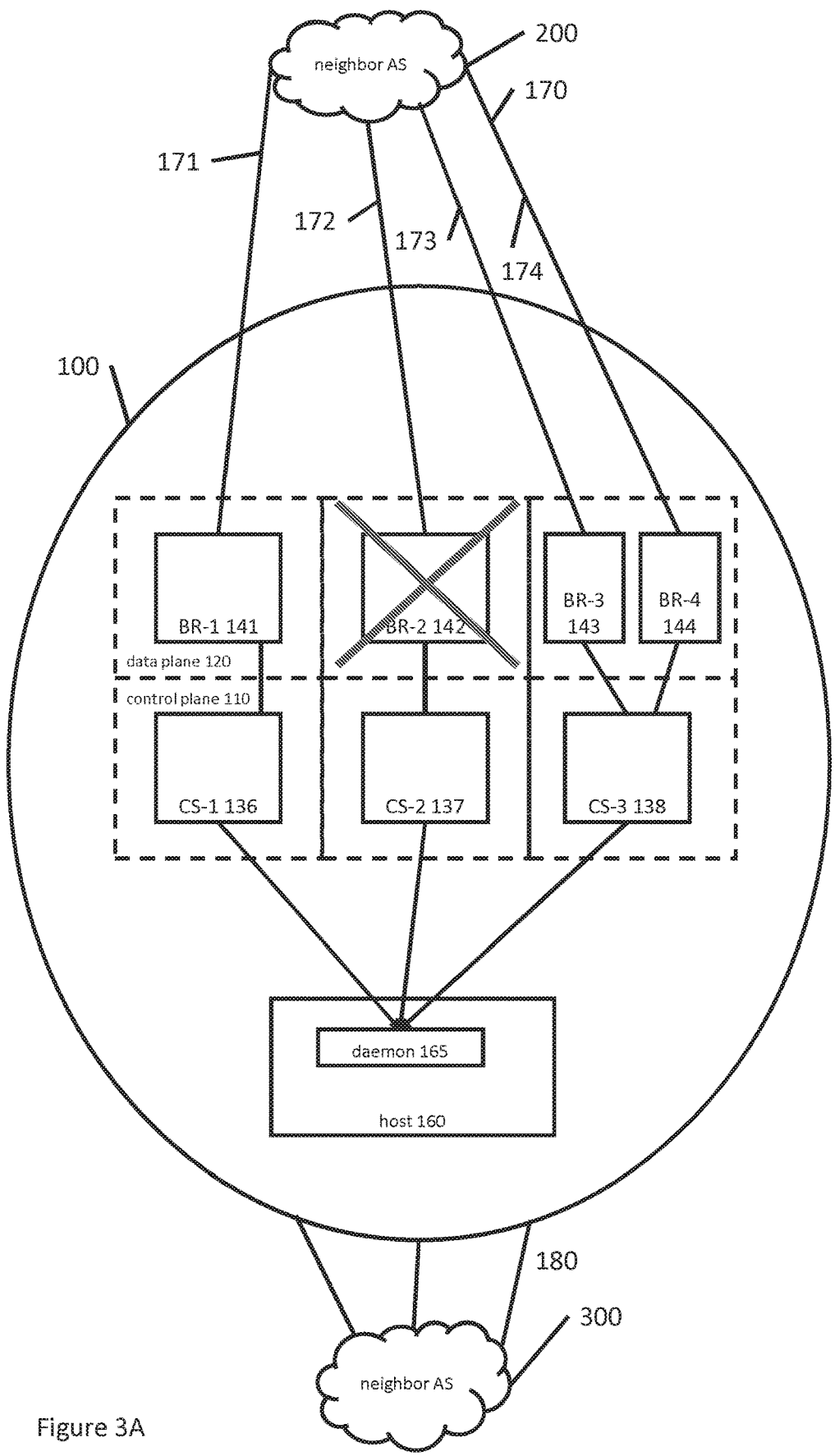
FIG. 3A illustrates the situation of a failure of a border router, BR, in one of the shards of a sharded autonomous system of FIG. 2.

FIG. 3A illustrates the sharded AS 100 of FIG. 2. However, in contrast to what is shown in FIG. 2, BR-2 142 has failed in FIG. 3A. For the following description, sharded AS 100 is called sharded local AS 100.

The failure of BR-2 142 means that path information will no longer be received from the first neighboring AS 200 and will not be forwarded to corresponding CS-2 137. Further, local host 160 is obviously unable to forward data packets to a destination AS via BR-2 142.

However, the remaining BRs BR-1 141, BR-3 143 and BR-4 144 continue to receive path information from the first neighboring AS 200 and continue to forward said received path information to the respective CSes CS-1 136 and CS-3 138 of the remaining shards of sharded local AS 100. Accordingly, CS-1 136 and CS-3 138 have access to path information and are enabled to construct, store, and subsequently forward fresh path segments linking sharded local AS 100 with first neighboring AS 200. Hence, data packets from local host 160 can still reach first neighboring AS 200 and finally also a desired destination AS by forwarding said data packets via one of the BRs BR-1 141, BR-3 143, and BR-4 144 in the remaining shards of the sharded local AS 100.

Obviously, the situation described with respect to FIG. 3A is merely an example based on which the consequences of the failure of one of BRs BR-1 141, BR-2 142, BR-3 143, and BR-4 144 are explained. The same description holds true also for the situation that instead of BR-2 142, any one or more of the other illustrated BRs BR-1 141, BR-3 143, and BR-4 144 has failed.

Figure 3B:
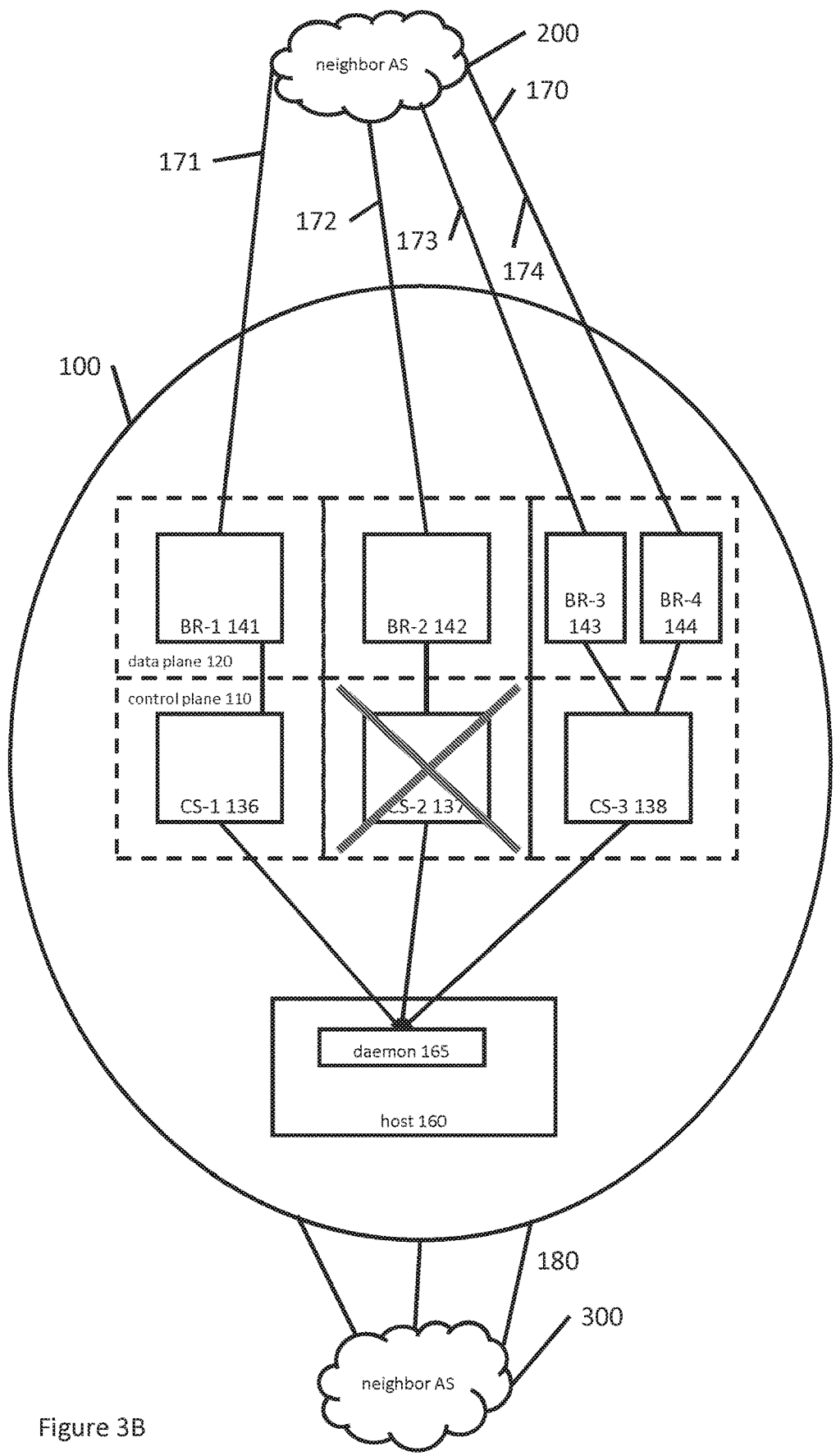
FIG. 3B illustrates the situation of a failure of a control service, CS, in one of the shards of a sharded autonomous system of FIG. 2.

FIG. 3B shows the same sharded local AS 100 of FIGS. 2 and 3A and refers to the situation that BR-2 142 is functioning properly again, but that instead CS-2 137 has failed. In such a situation, BR-2 142 is still available for receiving and forwarding path information and data packets. However, since no new path segments are being constructed anymore by CS-2 137, eventually all paths will expire and BR-2 142 will no longer be usable for forwarding data packets.

However, CSes CS-1 136 and CS-3 138 of the remaining shards of the three shards into which sharded local AS 100 has been split are still functioning properly. Therefore, both CS-1 136 and CS-3 138 are still provided by the first neighboring AS 200 with path information to construct fresh path segments using respective links 171, 173, and 174. Said path information received from the first neighboring AS 200 is processed by CSes CS-1 136 and CS-3 138 and supplemented by adding a respective subset of the information about the links 171, 173, and 174 connecting the sharded local AS 100 to the first neighboring AS 200. Further, said supplemented path information is registered by CSes CS-1 136 and CS-3 138 of the remaining shards in order to make said supplemented path information available to local host 160 as well as to remote hosts. Moreover, CS-1 136 and CS-3 138 are configured to store the respective shards of path segments in their respective segment storages and to propagate the respective shards of the supplemented path information to the second neighboring AS 180.

Accordingly, the daemon 165 of local host 160 is automatically provided with the constructed fresh path segments to the first neighboring AS 200 via the remaining shards of the sharded local AS 100 in response to a request for available path segments used for combining to a path for routing data packets to a destination AS. Hence, the sharded nature of sharded local AS 100 assures that daemon 165 of local host 160 is always enabled to fetch freshly constructed path segments from the plurality of CSes CS-1 136, CS-2 137, and CS-3 138.

This functionality of sharded local AS 100 can still be improved. If CS-2 137 fails as shown in FIG. 3B, path information would still be forwarded from the first neighboring AS 200 to BR-2 142 of sharded local AS 100 via link 172. However, according to an aspect of the present application, BR-2 142 is configured to notice that corresponding CS-2 137 of the same shard has failed. When BR-2 142 detects that corresponding CS-2 137 has failed, BR-2 142 is further configured to reroute the path information received from the first neighboring AS 200 to one of the CSes CS-1 136 and CS-3 138 of the remaining shards of the sharded local AS 100. The choice of the selected CS of the remaining CSes to which BR-2 142 reroutes the path information is hereby arbitrary.

BR-2 142 is further enabled to notice whether corresponding CS-2 137 of the same shard of sharded local AS 100 has failed or not by periodically using the health check port 134 (not shown in FIG. 3B) that is exposed by CS-2 137 to BR-2 142 to check the health of CS-2 137.

Obviously, the situation described with respect to FIG. 3B is merely an example based on which the consequences of the failure of one of CSes CS-1 136, CS-2 137, and CS-3 138 are explained. The same description holds also true for the situation that instead of CS-2 137, either one or both of the other illustrated CSes CS-1 136 and CS-3 138 has failed.

Figure 4:
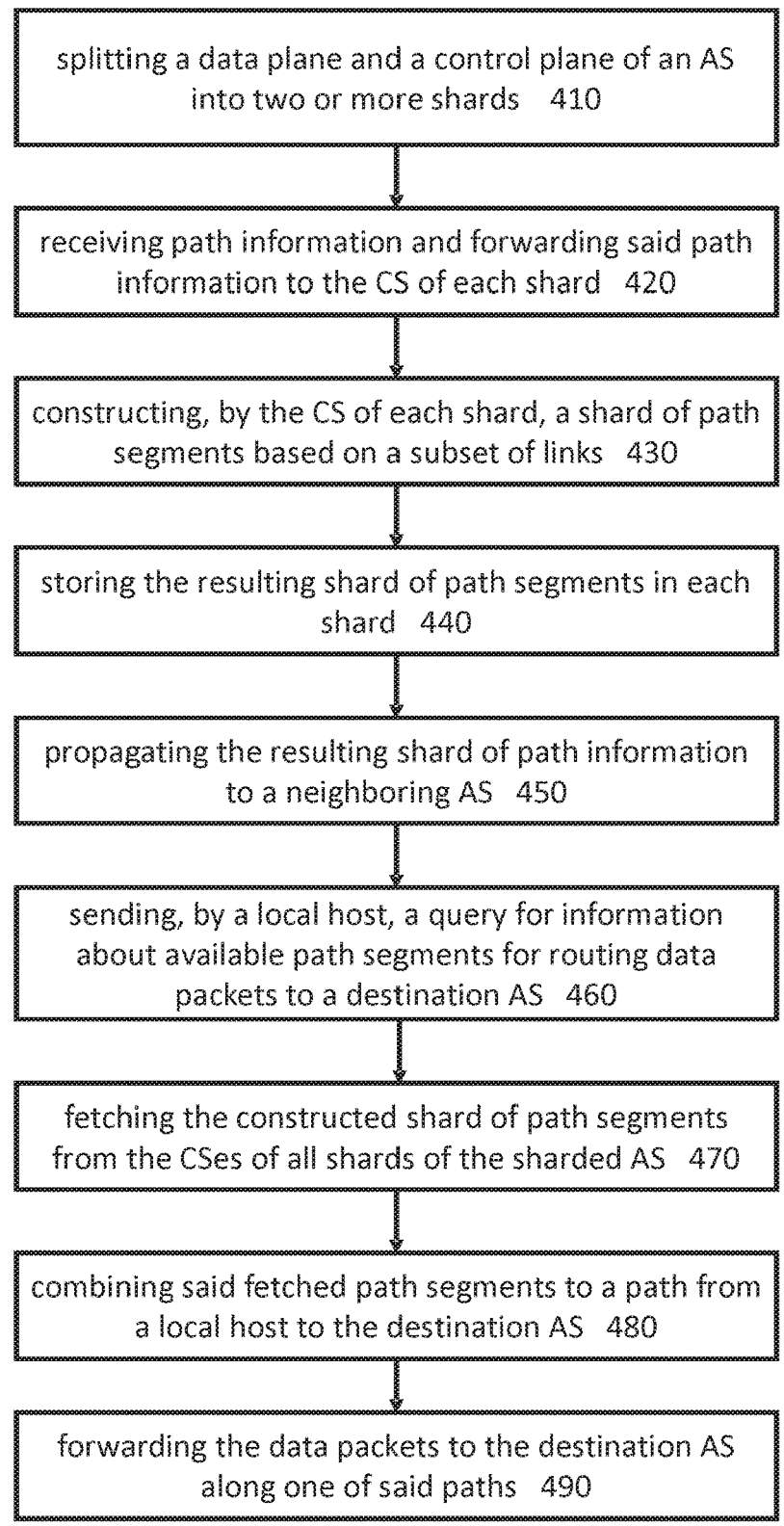
FIG. 4 illustrates a flow diagram of a method for reliably forwarding data packets according to an embodiment of the present application.

FIG. 4 illustrates a method 400 for reliably forwarding data packets from a local host in an AS of a source-selected path routing network that includes a plurality of ASes to a destination AS according to an embodiment of the present application.

In a first step 410 of said method, a data plane 110 of each of the plurality of ASes comprising one or more border routers, BRs 140, and a control plane 120 of each of the plurality of ASes comprising a control service, CS, 120 are split into two or more so-called shards. Each of said two or more shards comprises hereby one or more BRs 141, 142, 143, 144 and exactly one CS 136, 137, or 138.

The one or more BRs 141, 142, 143, 144 of each shard of a sharded AS 100 implemented as described under step 410 further receive path information sent from the CSes of a neighboring AS 200 and forward said path information to the corresponding CS 136, 137, 138 of each shard in step 420.

In a subsequent step 430, the CS 136, 137, 138 of each shard of the sharded AS 100 construct a shard of path segments by supplementing the received path information by adding information about a corresponding subset of links 171, 172, 173, 174 connecting the respective shard to the neighboring AS 200 and by registering the supplemented path information in order to make it available to local and remote hosts.

Moreover, in step 440, the CS 136, 137, 138 of each shard of the sharded AS 100 stores the resulting shard of constructed path segments in a segment storage and propagates the resulting shard of supplemented path information to a second neighboring AS 300 in step 450.

In step 460, a local host 160 of the sharded AS 100 sends a query for information about available path segments for routing data packets to a destination AS to CS 130 of AS 100.

While the local host 160 is not aware of the sharded nature of AS 100, a daemon 165 of the local host 160 acts as a multiplexer across the different shards of AS 100. Hence, said daemon 165 fetches the constructed shard of path segments from the CSes 136, 137, 138 of all shards of the sharded AS 100 in step 470.

Subsequently, in step 480, the daemon 165 combines the fetched path segments to a complete path from the local host 160 to the destination AS.

Finally, the one or more BRs 141, 142, 143, 144 of one shard of the sharded AS 100 forward said data packets from the local host 160 to a destination AS along one of said paths.

This described method according to an embodiment of the present application illustrates how in a source-selected path routing network it may be guaranteed that data packets are still forwarded from a local host to a destination AS if one or more of the respective BRs 141, 142, 143, 144 and CSes 136, 137, 138 in the sharded AS 100 fails. Namely, the functioning of the failed BR and/or CS of one shard may be taken over by a respective BR and/or CS in a different, remaining shard of the sharded AS 100.

As pointed out above, the present application may not only be applied to the specific context of a SCION network. Instead, it may be applied to any source-selected path routing network that works in a similar way as SCION.

Further, the steps of the method as described above may also be stored on a non-transitory computer-readable medium. From the forgoing and further it will be appreciated that, although specific embodiments have been described herein for purposes of illustration, various modifications may be made without deviating from the scope of the present disclosure. The scope of the present application is limited by the appended claims.

The invention claimed is:

1. An autonomous system (AS) in a source-selected path routing network comprising:
   a data plane comprising one or more border routers (BRs) configured to receive path information from a first neighboring AS and to forward the path information to a control service (CS);
   a control plane comprising the CS, wherein the CS is configured to construct path segments by supplementing the path information by adding information about a plurality of links connecting the AS to the first neighboring AS and by registering the supplemented path information to make it available to local and remote hosts and to store the resulting path segments in a database, and further to propagate the supplemented path information to a second neighboring AS,
   wherein the data plane comprising the one or more BRs is further configured to forward data packets across a link selected from the plurality of links based on the constructed path segments,
   wherein the data plane and the control plane are split into a plurality of shards, each shard comprising one or more BRs and exactly one CS, and wherein the CS of each shard is configured to construct a shard of path segments by supplementing the received path information by adding information about a subset of the links connecting the AS to the first neighboring AS and by registering the supplemented path information to make it available to local and remote hosts and to store the resulting shard of path segments in a segment storage, and further to propagate said shard of supplemented path information to the second neighboring AS; and
   a local host configured to send a query for information about available path segments for routing a data packet to a destination AS, wherein the local host comprises a daemon configured to fetch the constructed shards of path segments from the CSes of all shards and to combine said fetched path segments to a path from the local host to the destination AS.

2. The AS of claim 1, wherein the CS of one shard is completely independent and separate from CSes of remaining shards of the plurality of shards; and/or
   wherein the path information comprises a path-segment construction beacon (PCB).

3. The AS of claim 2, wherein by registering the path information, the CS is configured to determine which path information to make available to the local hosts and which path information to make available to the remote hosts in to reach the AS.

4. The AS of claim 3, wherein the daemon is configured to act as a multiplexer across the two or more shards and to hide the sharded nature from the local host.

5. The AS of claim 4, wherein the CS of each shard comprises a beaconing module configured to construct the shard of path segments and a path module configured to respond to a path request received from the daemon of the local host.

6. The AS of claim 5, further comprising that if the one or more BRs of one shard fails, the BRs of the remaining shards of the two or more shards of the sharded local AS are configured to:
   continue to receive the path information from the first neighboring AS and to forward the path information to the respective CSes of the remaining shards; and
   forward the data packet sent by the local host to the destination AS via one of the remaining shards.

7. The AS of claim 6, further comprising that if the CS of one shard fails, the CSes of the remaining shards of the two or more shards of are configured to:
   construct fresh path segments by supplementing the received path information by adding a respective subset of the information about the links connecting the AS to the first neighboring AS and by registering the supplemented path information to make it available to local and remote hosts and to store the resulting shard of path segments in the segment storage, and further to propagate said shard of supplemented path information to the second neighboring AS; and provide the daemon of the local host automatically with the constructed fresh path segments.

8. The AS of claim 7, wherein the one or more BRs of one shard is configured to notice that the corresponding CS of the same shard has failed and is further configured to reroute the path information received from the first neighboring AS to one of the CSes of the remaining shards.

9. The AS of claim 8, wherein the one or more BRs of the one shard is configured to notice whether the corresponding CS of the same shard has failed or not by periodically using a health check port exposed by the CS to the one or more BRs in the same shard.

10. A method for forwarding data packets in a source-selected path routing network including a plurality of autonomous systems (ASes) comprising the steps of:
   splitting a data plane of each of the plurality of ASes comprising one or more border routers (BRs) and a control plane of each of the plurality of ASes comprising a control service (CS) into two or more shards, wherein each of the two or more shards comprises one or more BRs and exactly one CS;
   receiving, by the one or more BRs of each shard of a sharded local AS, path information sent from the CSes of a first neighboring AS and forwarding the path information to the corresponding CS of each shard;
   constructing, by the CS of each shard of the sharded local AS, a shard of path segments by supplementing the received path information by adding information about a corresponding subset of links connecting the respective shard to the first neighboring AS and by registering the supplemented path information to make it available to local and remote hosts;
   storing the resulting shard of path segments in a segment storage in the CS of each shard of the sharded local AS;
   propagating the resulting shard of supplemented path information to the second neighboring AS;
   sending, by a local host of the sharded local AS, a query for information about available path segments for routing data packets to a destination AS;
   fetching the constructed shard of path segments from the CSes of all shards of the sharded local AS by a daemon of the local host;
   combining, by the daemon, said fetched path segments to a path from the local host to the destination AS; and
   forwarding the data packets to the destination AS along one of said paths by the one or more BRs of one shard of the sharded local AS.

11. The method of claim 10, further comprising:
   if the one or more BRs of one shard of the sharded local AS fails:
   continuing receiving the path information from the first neighboring AS at the one or more BRs of the remaining shards of the two or more shards of the sharded local AS and forwarding said path information to the respective CSes of the remaining shards of the sharded local AS; and
   forwarding the data packets sent by the local host to the destination AS via the one or more BRs of one of the remaining shards of the sharded local AS.

12. The method of claim 10, further comprising:
   if the CS of one shard of the sharded local AS fails:
   constructing, by the CSes of the one or more remaining shards of the sharded local AS, fresh path segments by supplementing the received path information by adding a respective subset of the information about the links connecting the respective shard to the first neighboring AS and by registering the supplemented path information in order to make it available to local and remote hosts, storing the resulting shard of path segments in the segment storage, and further propagating said shard of supplemented path information to the second neighboring AS; and
   automatically providing, by the daemon, the local host with the constructed fresh path segments to the destination AS retrieved from the CSes of the remaining shards of the sharded local AS.

13. The method of claim 12, further comprising:
   periodically checking, by the one or more BRs of each shard of the sharded local AS, whether a corresponding CS of the same shard is healthy;
   noticing that the corresponding CS of the same shard has failed; and
   rerouting the path information received from the first neighboring AS to one of the CSes of the remaining shards of the sharded local AS.

14. A computer-readable storage medium comprising instructions which, when executed by a processor or processors, cause a device or devices to perform operations, the operations comprising:
   splitting a data plane of each of the plurality of ASes comprising one or more border routers (BRs) and a control plane of each of the plurality of ASes comprising a control service (CS) into two or more shards, wherein each of the two or more shards comprises one or more BRs and exactly one CS;
   receiving, by the one or more BRs of each shard of a sharded local AS, path information sent from the CSes of a first neighboring AS and forwarding the path information to the corresponding CS of each shard;
   constructing, by the CS of each shard of the sharded local AS, a shard of path segments by supplementing the received path information by adding information about a corresponding subset of links connecting the respective shard to the first neighboring AS and by registering the supplemented path information to make it available to local and remote hosts;
   storing the resulting shard of path segments in a segment storage in the CS of each shard of the sharded local AS;
   propagating the resulting shard of supplemented path information to the second neighboring AS;
   sending, by a local host of the sharded local AS, a query for information about available path segments for routing data packets to a destination AS;
   fetching the constructed shard of path segments from the CSes of all shards of the sharded local AS by a daemon of the local host;
   combining, by the daemon, said fetched path segments to a path from the local host to the destination AS; and
   forwarding the data packets to the destination AS along one of said paths by the one or more BRs of one shard of the sharded local AS.

15. The computer-readable medium of claim 14, wherein the operations further comprise:
   if the one or more BRs of one shard of the sharded local AS fails:
   continuing receiving the path information from the first neighboring AS at the one or more BRs of the remaining shards of the two or more shards of the sharded local AS and forwarding said path information to the respective CSes of the remaining shards of the sharded local AS; and forwarding the data packets sent by the local host to the destination AS via the one or more BRs of one of the remaining shards of the sharded local AS.

16. The computer-readable medium of claim 14, wherein the operations further comprise:

if the CS of one shard of the sharded local AS fails:

constructing, by the CSes of the one or more remaining shards of the sharded local AS, fresh path segments by supplementing the received path information by adding a respective subset of the information about the links connecting the respective shard to the first neighboring AS and by registering the supplemented path information in order to make it available to local and remote hosts, storing the resulting shard of path segments in the segment storage, and further propagating said shard of supplemented path information to the second neighboring AS; and automatically providing, by the daemon, the local host with the constructed fresh path segments to the destination AS retrieved from the CSes of the remaining shards of the sharded local AS.

17. The computer-readable medium of claim 14, wherein the operations further comprise:

periodically checking, by the one or more BRs of each shard of the sharded local AS, whether a corresponding CS of the same shard is healthy;

noticing that the corresponding CS of the same shard has failed; and rerouting the path information received from the first neighboring AS to one of the CSes of the remaining shards of the sharded local AS.

18. The computer-readable medium of claim 14, wherein the CS of one shard is independent and separate from CSes of remaining shards of the plurality of shards; and/or wherein the path information comprises a path-segment construction beacon (PCB).

19. The computer-readable medium of claim 14, wherein by registering the path information, the CS is configured to determine which path information to make available to the local hosts and which path information to make available to the remote hosts in to reach the AS.

20. The computer-readable medium of claim 14, wherein the daemon is configured to act as a multiplexer across the two or more shards and to hide the sharded nature from the local host.

* * * * *